(12) United States Patent
Hung

(10) Patent No.: US 9,046,665 B2
(45) Date of Patent: Jun. 2, 2015

(54) OPTICAL COUPLING MODULE AND OPTICAL FIBER COUPLING CONNECTOR

(71) Applicant: Hon Hai Precision Industry Co., Ltd., New Taipei (TW)

(72) Inventor: Yi Hung, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 12 days.

(21) Appl. No.: 13/950,378

(22) Filed: Jul. 25, 2013

(65) Prior Publication Data

US 2014/0178001 A1    Jun. 26, 2014

(30) Foreign Application Priority Data

Dec. 20, 2012  (TW) .............................. 101148558 A

(51) Int. Cl.
*G02B 6/34* (2006.01)
*G02B 6/32* (2006.01)
*G02B 6/42* (2006.01)
*G02B 15/177* (2006.01)

(52) U.S. Cl.
CPC ............ *G02B 6/4214* (2013.01); *G02B 15/177* (2013.01); *G02B 6/423* (2013.01); *G02B 6/4243* (2013.01); *G02B 6/4244* (2013.01); *G02B 6/4246* (2013.01)

(58) Field of Classification Search
CPC ..................................................... G22B 15/177
USPC ....................................................... 385/33, 36
See application file for complete search history.

(56) References Cited

U.S. PATENT DOCUMENTS

| | | | |
|---|---|---|---|
| 4,420,219 A * | 12/1983 | Muchel ........................... | 385/74 |
| 7,489,840 B2 * | 2/2009 | Sekiya et al. .................... | 385/36 |
| 2004/0258354 A1 * | 12/2004 | Sekiya et al. .................... | 385/35 |
| 2006/0008199 A1 * | 1/2006 | Glebov et al. ................... | 385/15 |
| 2009/0148099 A1 * | 6/2009 | Sekiya et al. .................... | 385/33 |

* cited by examiner

*Primary Examiner* — Eric Wong
*Assistant Examiner* — Mary El Shammaa
(74) *Attorney, Agent, or Firm* — Novak Druce Connolly Bove + Quigg LLP

(57) ABSTRACT

An optical coupling module includes a reflection member, first and second assembled members, first and second converging lenses. The reflection member includes a first surface, a second surface perpendicular connected to the first surface, and a reflection surface obliquely interconnected between the first and second surfaces. The first assembled member includes a first optical surface and is detachably mounted on the first surface. The second assembled member includes a second optical surface and is detachably mounted on the second surface. The first converging lenses are arranged on the first optical surface. The second converging lenses are arranged on the second optical surface and correspond to the second converging lenses. The reflection surface reflects parallel light beams from the first converging lenses toward the corresponding second converging lenses and reflects parallel light beams from the second converging lenses toward the corresponding first converging lenses.

7 Claims, 5 Drawing Sheets

OPTICAL COUPLING MODULE AND OPTICAL FIBER COUPLING CONNECTOR

BACKGROUND

1. Technical Field

The present disclosure relates to communication technologies, and particularly to an optical coupling module and an optical fiber coupling connector.

2. Description of Related Art

An optical fiber coupling connector includes a number of light-emitting modules, an optical coupling module, a number of light-receiving modules, and a number of optical fibers. The optical fibers correspond to and are optically coupled with the light-emitting modules and the light-receiving modules one-to-one through the optical coupling module. The optical coupling module is configured for guiding light emitted from the light-emitting modules to the corresponding optical fibers and for guiding light from the optical fibers to the corresponding light-receiving modules.

When in transit, the optical coupling module is easily damaged. If this happens, the entire optical coupling module must be replaced because the optical coupling module is usually a single piece. This wastes resources and money.

Therefore, it is desirable to provide an optical coupling module and an optical fiber coupling connector, which can overcome or at least alleviate the above-mentioned problems.

DETAILED DESCRIPTION

Figure 1:
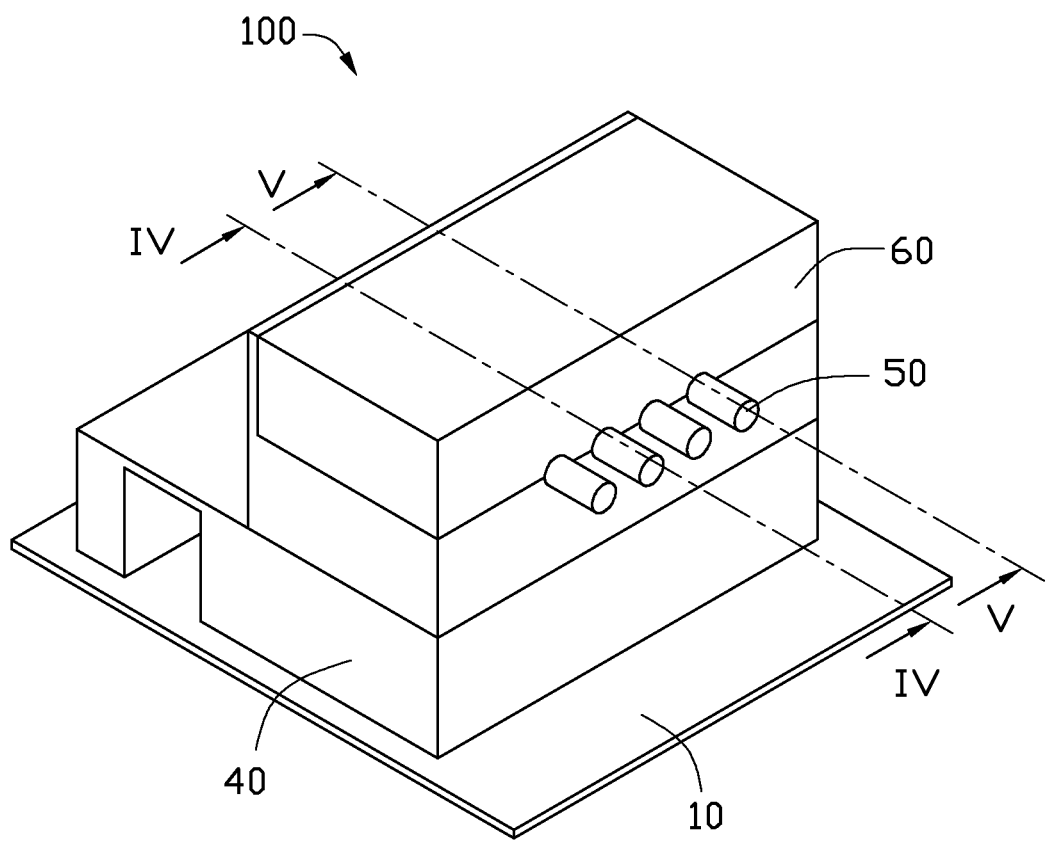
FIG. 1 is a schematic, isometric view of an optical fiber coupling connector, according to an exemplary embodiment.
Figure 2:
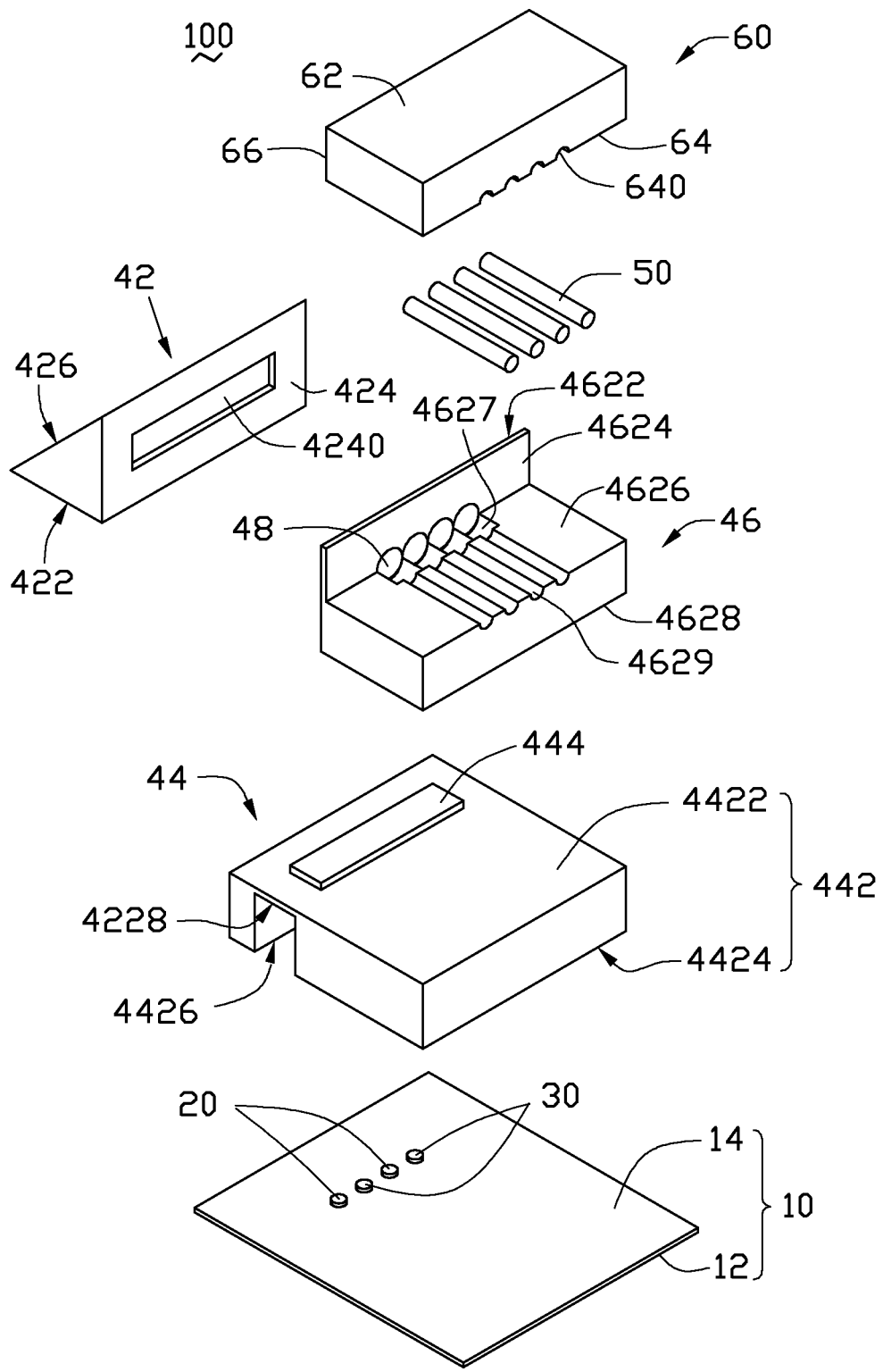
FIG. 2 is an exploded view of the optical fiber coupling connector of FIG. 1.

FIGS. 1-2 show an optical fiber coupling connector 100 according to an exemplary embodiment. The optical fiber coupling connector 100 includes a circuit board 10, two light-emitting modules 20, two light-receiving modules 30, an optical coupling module 40, four optical fibers 50, and a cover 60.

Figure 3:
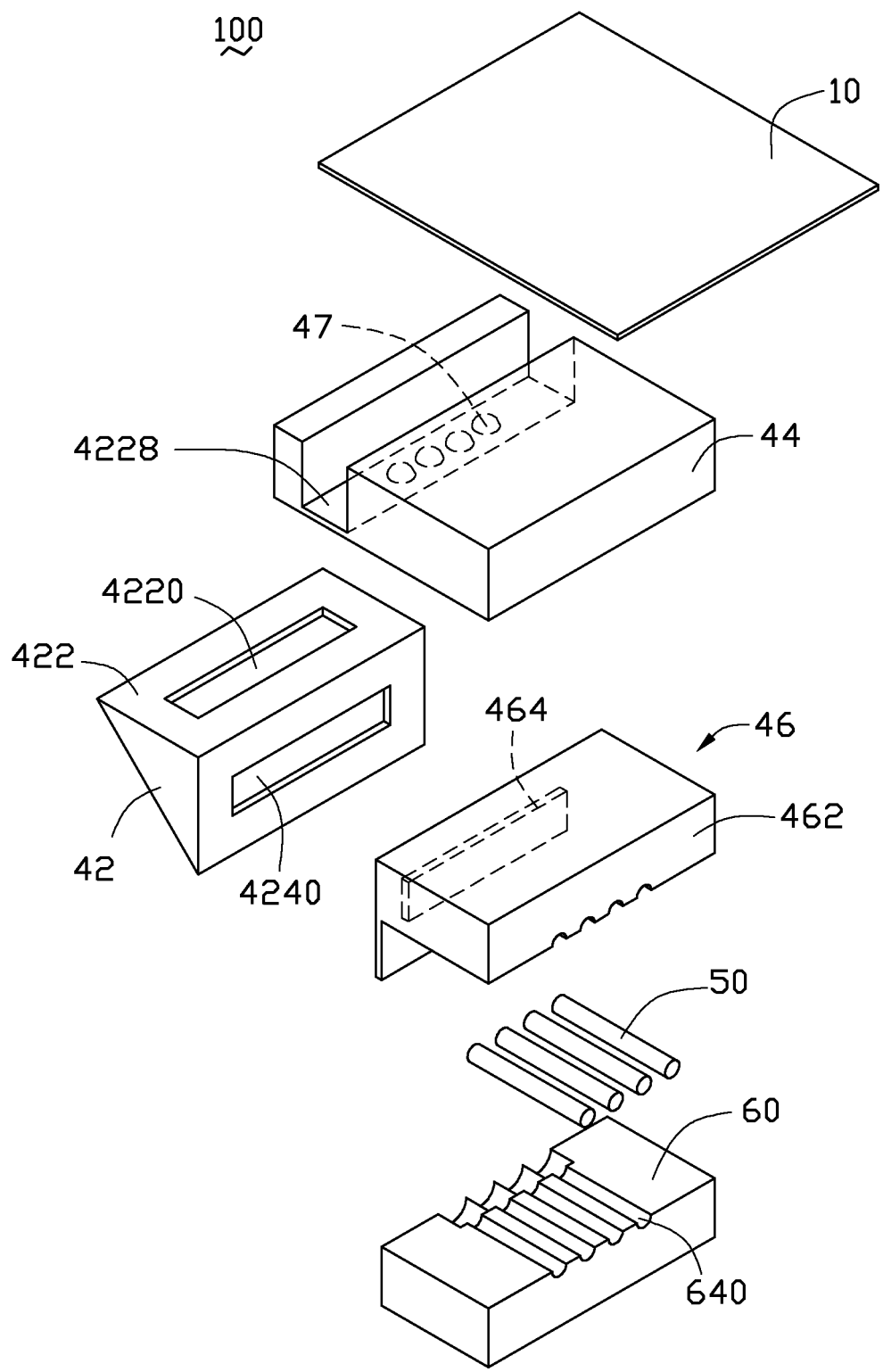
FIG. 3 is similar to FIG. 2, but viewed from another angle.

FIGS. 2-3 show that the circuit board 10 includes a bottom surface 12 and a top surface 14. The bottom surface 12 and the top surface 14 are positioned at opposite sides of the circuit board 10, and the bottom surface 12 is substantially parallel to the top surface 14.

The two light-emitting modules 20 and the two light-receiving modules 30 are mounted on the top surface 14 and are electrically connected to the circuit board 10. In detail, the two light-emitting modules 20 and the two light-receiving modules 30 are alternatively arranged in a straight line. That is, centers of the light-emitting modules 20 and centers of the light-receiving modules 30 are arranged in a straight line. In this embodiment, each of the light-emitting modules 20 is a vertical cavity surface emitting laser (VCSEL) diode and is configured for converting electric signals to optical signals and emitting light beams. Each of the light-receiving modules 30 is a photo-diode and is configured for receiving light beams and converting optical signals to electric signals.

The optical coupling module 40 includes a reflection member 42, a first assembled member 44, a second assembled member 46, four first converging lenses 47, and four second converging lenses 48.

The reflection member 42 is substantially a straight-triangular prism. The reflection member 42 includes a first surface 422, a second surface 424, and a reflection surface 426. The second surface 424 is perpendicularly connected to the first surface 422. The reflection surface 426 is obliquely interconnected between the first surface 422 and the second surface 424. An included angle between the first surface 422 and the reflection surface 426 is about 45 degrees, and an included angle between the second surface 424 and the reflection surface 426 is about 45 degrees. The first surface 422 defines a first groove 4220. The second surface 424 defines a second groove 4240. In this embodiment, each of the first groove 4220 and the second groove 4240 is substantially rectangular.

The first assembled member 44 includes a first body portion 442 and a first protrusion 444. The first body portion 442 is substantially cuboid. The first body portion 422 includes a first assembled surface 4422 and a connection surface 4424. The first assembled surface 4422 and the connection surface 4424 are positioned at opposite sides of the first body portion 442, and the first assembled surface 4422 is parallel to the connection surface 4424. The connection surface 4424 defines an elongated cavity 4426. The first body portion 442 further includes a first optical surface 4428 at a bottom of the cavity 4426. In this embodiment, the first optical surface 4428 is parallel to the connection surface 4424 and the first assembled surface 4422. The first protrusion 444 perpendicularly protrudes from the first assembled surface 4422 and corresponds to the first groove 4220. In this embodiment, the first protrusion 444 is substantially cuboid and is aligned with the cavity 4426.

The second assembled member 46 includes a second body portion 462 and a second protrusion 464. The second body portion 462 has a substantially L-shaped cross-section. The second body portion 462 includes a second assembled surface 4622, a second optical surface 4624, an upper surface 4626, and a lower surface 4628. The second assembled surface 4622 is substantially parallel to and opposite to the second optical surface 4624. The upper surface 4626 is substantially parallel to and opposite to the lower surface 4628. The upper surface 4626 is perpendicularly connected to the second optical surface 4624, and the lower surface 4628 is perpendicularly connected to the second assembled surface 4622. The upper surface 4626 defines four receiving grooves 4629 and four receiving recesses 4627 corresponding to the four receiving grooves 4629. The four receiving grooves 4629 are substantially parallel to each other, and the longitudinal direction of each of the receiving grooves 4629 is substantially perpendicular to the second optical surface 4624. Each of the receiving grooves 4629 is in communication with the corresponding receiving recess 4627, and each of the receiving recess 4627 is interconnected between the second optical surface 4624 and the corresponding receiving groove 4629. The second protrusion 464 perpendicularly protrudes from the second assembled surface 4622 and corresponds to the second groove 4240. In this embodiment, the second protrusion 464 is substantially cuboid.

The first converging lenses 47 are arranged on the first optical surface 4228 in a straight line. Optical axes of the first converging lenses 47 are substantially perpendicular to the first optical surface 4228. The second converging lenses 48 are arranged on the second optical surface 4624 in a straight line. Optical axes of the second converging lenses 48 are substantially perpendicular to the second optical surface 4624. The second converging lenses 48 are located in the receiving recesses 4627 and are aligned with the receiving grooves 4629, respectively. In this embodiment, the first converging lenses 47 and the first assembled member 44 are formed into a unitary piece, and the second converging lenses 48 and the second assembled member 46 are formed into a unitary piece.

The optical fibers 50 are received in the receiving grooves 4629 and are aligned with the second converging lenses 48, respectively.

The cover 60 is substantially rectangular. The cover 60 includes a first outer surface 62, a second outer surface 64, and four side surfaces 66. The first outer surface 62 and the second outer surface 64 are positioned at opposite sides of the cover 60, and the first outer surface 62 is parallel to the second outer surface 64. The four side surfaces 66 connect each other end-to-end and are interconnected between the first outer surface 62 and the second outer surface 64. The second outer surface 64 defines four engaging grooves 640 conforming to the optical fibers 50 and four engaging recesses 642 (shown in FIG. 4) corresponding to the four engaging grooves 640. The four engaging grooves 640 are substantially parallel to each other, and the longitudinal direction of each the engaging grooves 640 is substantially parallel to that of each of the receiving grooves 4629. Each of the engaging grooves 640 communicates with the corresponding engaging recess 642.

The first converging lenses 47 and the first assembled member 44 may be independent from each other, and the second converging lenses 48 and the second assembled member 46 may also be independent from each other. The number of the first converging lenses 47, of the second converging lenses 48, and of the optical fibers 50 is not limited to be four, and may be two, six, eight, ten or other multiple of two which accords with the total number of the light-emitting module 20 and of the light-receiving module 30.

When the optical coupling module 40 is assembled, the first protrusion 444 engages in the first groove 4220 so that the first assembled member 44 is mounted on the first surface 422, and the second protrusion 464 engages in the second groove 4240 so that the second assembled member 46 is mounted on the second surface 424. In this situation, the first assembled surface 4422 contacts the first surface 422, and the first surface 422 is substantially parallel to the first optical surface 4228. The second assemble surface 4622 contacts the second surface 424, and the second surface 424 is substantially parallel to the second optical surface 4624. The lower surface 4628 contacts the first assemble surface 4622. The first converging lenses 47 correspond to the second converging lenses 48.

When the optical fiber coupling connector 100 is assembled, first, the connection surface 4424 is supported on the top surface 14, and the first converging lenses 47 are aligned with the light-emitting modules 20 and the light-emitting modules 30. Second, adhesive agent is applied between the circuit board 10 and the optical coupling module 40 so that the optical coupling module 40 is tightly adhered to the circuit board 10. Third, the optical fibers 50 are received in the receiving grooves 4629, thus the optical fibers 50 are aligned with the second converging lenses 48. Fourth, the cover 60 is fixed on the upper surface 4626 by an adhesive agent to affix the optical fibers 50. In detail, the second outer surface 64 contacts the upper surface 4626, the engaging grooves 640 cooperate with the receiving grooves 4629 to retain the optical fibers 50. The engaging recesses 642 cooperate with the receiving recesses 4627 to receive the second converging lenses 48. One of the side surfaces 66 contacts the second optical surface 4624.

Figure 4:
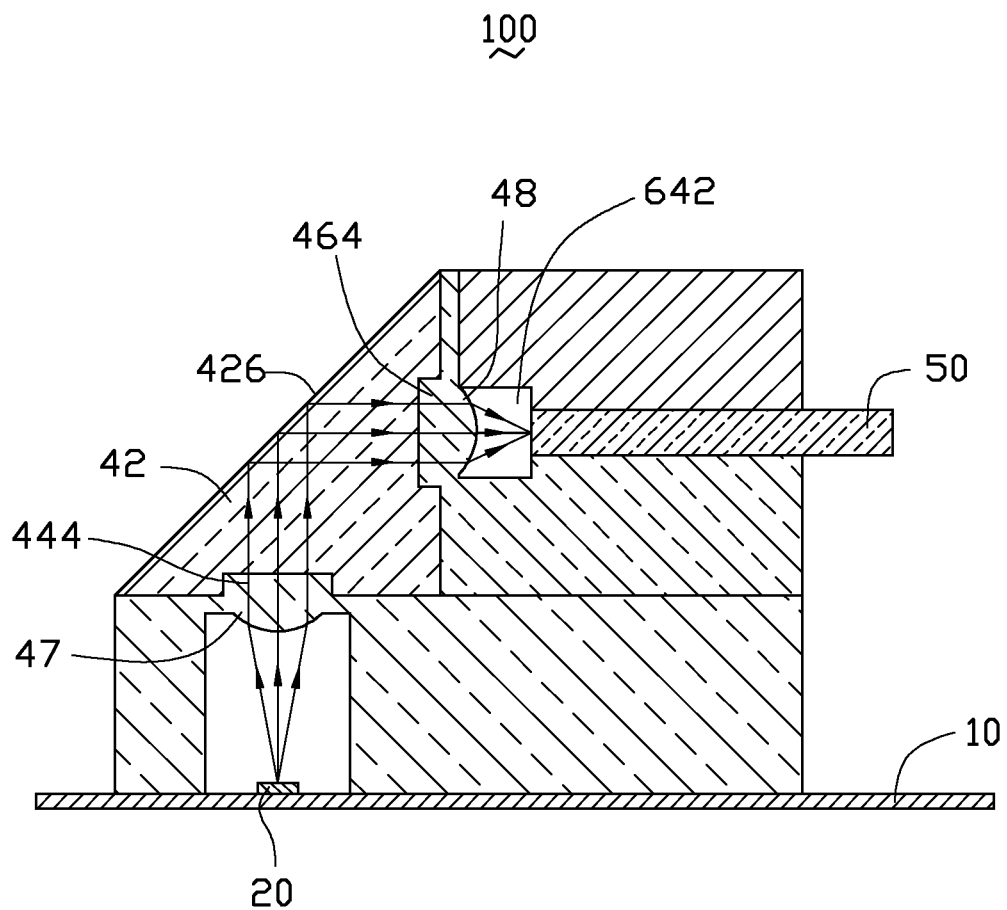
FIG. 4 is a cross-sectional view of the optical fiber coupling connector of FIG. 1, taken along the line IV-IV of FIG. 1.

Referring to FIG. 4, when the optical fiber coupling connector 100 is in use, electrical power is applied to the light-emitting modules 20 and the light-receiving modules 30 through the circuit board 10. Thus, light beams emitted from each of the light-emitting modules 20 pass through the corresponding first converging lens 47 and become parallel light beams. The parallel light beams perpendicularly pass through the first protrusion 444 and are reflected by the reflection surface 426 toward the second protrusion 464, and then perpendicularly pass through the second protrusion 464 to reach the corresponding second converging lens 48, and are finally converged to the corresponding optical fiber 50 by the second converging lens 48.

Figure 5:
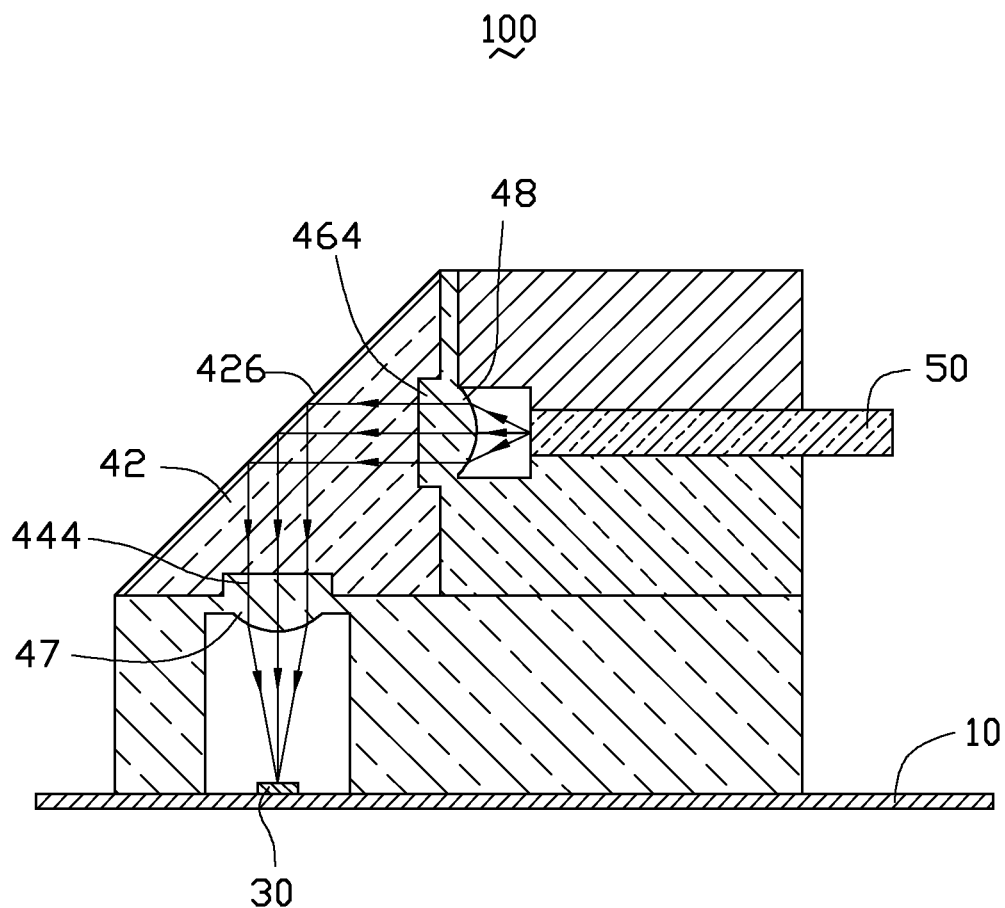
FIG. 5 is a cross-sectional view of the optical fiber coupling connector of FIG. 1, taken along the line V-V of FIG. 1.

Accordingly, FIG. 5 shows that light beams from the each of the optical fibers 50 become parallel light beams after passing the corresponding second converging lens 48. The parallel light beams perpendicularly pass through the second protrusion 464 and are reflected by the reflection surface 426 toward the first protrusion 444, and finally pass through the first protrusion 444 to be converged by the corresponding first converging lens 47 to the corresponding light-receiving module 30. The light-receiving module 30 receives the light beams and converts optical signals represented by the light beam to electric signals.

In the optical fiber coupling connector 100, the optical coupling module 40 is detachable, for example, the first assembled member 44 can be detached from the reflection member 42, and the second assembled member 46 can be detached from the reflection member 42. Thus, if a part of the optical coupling module 40, such as the reflection member 42, the first assembled member 44, or the second assembled member 46, is damaged, the damaged part, such as the reflection member 42, the first assembled member 44, or the second assembled member 46, only needs to be replaced. Replacing the entire optical can be avoided. Therefore, resources and money are saved.

Even though numerous characteristics and advantages of the present embodiments have been set forth in the foregoing description, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. An optical coupling module comprising:
a reflection member comprising a first surface, a second surface perpendicularly connected to the first surface, and a reflection surface obliquely interconnected between the first surface and the second surface;
a first assembled member comprising a first optical surface, the first assembled member detachably mounted on the first surface, the first optical surface being parallel to the first surface;
a second assembled member comprising a second optical surface, the second assembled member detachably mounted on the second surface, the second optical surface being parallel to the second surface;
a plurality of first converging lenses arranged on the first optical surface, optical axes of the first converging lenses being perpendicular to the first surface; and
a plurality of second converging lenses arranged on the second optical surface and corresponding to the second converging lenses, optical axes of the second converging lenses being perpendicular to the second surface;
wherein the reflection surface is configured for reflecting parallel light beams from the first converging lenses toward the corresponding second converging lenses and for reflecting parallel light beams from the second converging lenses toward the corresponding first converging lenses, wherein the first surface defines a first groove, the first assembly member comprises a first body portion and a first protrusion protruding from the first body portion, the first protrusion engages in the first groove, the first body portion comprises a first assembly surface contacting the first surface of the reflection member and a connection surface opposite to the first assembly surface, the first protrusion protrudes from the first assembled surface, the connection surface defines a cavity, the first optical surface is located at a bottom of the cavity, and the first protrusion is aligned with the cavity.

2. The optical coupling module as claimed in claim 1, wherein the second surface defines a second groove, the second assembled member comprises a second body portion and a second protrusion protruding from the second body portion, and the second protrusion engages in the second groove.

3. The optical coupling module as claimed in claim 2, wherein the second body portion has a substantially L-shaped cross-section, the second body portion comprises a second assembled surface contacting the second surface of the reflection member, an upper surface, a lower surface opposite to the upper surface, and the second optical surface opposite to the second assembled surface, the upper surface perpendicularly connects the second optical surface, the lower surface perpendicularly connects the second assembled surface, the upper surface defines a plurality of receiving grooves and a plurality of receiving recesses corresponding to and communicating with the receiving grooves, and the second converging lenses are located in the respective receiving recesses and are aligned with the respective receiving grooves.

4. An optical fiber coupling connector comprising:
   an optical coupling module comprising:
      a reflection member comprising a first surface, a second surface perpendicularly connected to the first surface, and a reflection surface obliquely interconnected between the first surface and the second surface;
      a first assembled member comprising a first optical surface, the first assembled member detachably mounted on the first surface, the first optical surface being parallel to the first optical surface;
      a second assembled member comprising a second optical surface, the second assembled member detachably mounted on the second surface, the second optical surface being parallel to the second surface;
      a plurality of first converging lenses arranged on the first optical surface, optical axes of the first converging lenses being perpendicular to the first surface;
      a plurality of second converging lenses arranged on the second optical surface and corresponding to the second converging lenses, optical axes of the second converging lenses being perpendicular to the second surface; wherein the reflection surface is configured for reflecting parallel light beams from the first converging lenses toward the corresponding second converging lenses and for reflecting parallel light beams from the second converging lenses toward the corresponding first converging lenses; and
      a plurality of optical fibers aligned with the second converging lenses respectively, wherein the first surface defines a first groove, the first assembled member comprises a first body portion and a first protrusion protruding from the first body portion, the first protrusion engages in the first groove, the first body portion comprises a first assembled surface contacting the first surface of the reflection member and a connection surface opposite to the first assembled surface, the first protrusion protrudes from the first assembled surface, the connection surface defines a cavity, the first optical surface is located at a bottom of the cavity, and the first protrusion in aligned with the cavity.

5. The optical fiber coupling connector as claimed in claim 4, wherein the second surface defines a second groove, the second assembled member comprises a second body portion and a second protrusion protruding from the second body portion, and the second protrusion engages in the second groove.

6. The optical fiber coupling connector as claimed in claim 5, wherein the second body portion has a substantially L-shaped cross-section, the second body portion comprises a second assembled surface contacting the second surface of the reflection member, an upper surface, a lower surface opposite to the upper surface, and the second optical surface opposite to the second assembled surface, the upper surface perpendicularly connects the second optical surface, the lower surface perpendicularly connects the second assembled surface, the upper surface defines a plurality of receiving grooves and a plurality of receiving recesses corresponding to and communicating with the receiving grooves, and the second converging lenses are located in the respective receiving recesses and are aligned with the respective receiving grooves.

7. The optical fiber coupling connector as claimed in claim 6, further comprising a cover, wherein the cover comprising a first outer surface and a second outer surface opposite to the first outer surface, the second outer surface defines a plurality of engaging grooves corresponding to the receiving grooves and a plurality of engaging recesses corresponding to the receiving recesses, the cover is supported on the upper surface, the optical fibers are received in the respective receiving grooves, the receiving grooves and the engaging grooves cooperatively retain the respective optical fibers, and the receiving recesses and the engaging recesses cooperatively receive the second converging lenses.

* * * * *